United States Patent [19]
Aybay

[11] Patent Number: 6,088,761
[45] Date of Patent: *Jul. 11, 2000

[54] REDUCED PIN SYSTEM INTERFACE

[75] Inventor: Gunes Aybay, Burlingame, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,581

[22] Filed: Mar. 31, 1997

[51] Int. Cl.⁷ .................................................. G06F 12/00
[52] U.S. Cl. ......................... 711/105; 395/309; 395/500
[58] Field of Search ................................. 395/500, 309; 711/105

[56] References Cited

U.S. PATENT DOCUMENTS

| | | | |
|---|---|---|---|
| 5,276,852 | 1/1994 | Callander et al. | 395/309 |
| 5,307,320 | 4/1994 | Farrer et al. | 365/230.01 |
| 5,404,464 | 4/1995 | Bennett | 395/281 |
| 5,446,696 | 8/1995 | Ware et al. | 365/222 |
| 5,511,024 | 4/1996 | Ware et al. | 365/189.04 |
| 5,513,327 | 4/1996 | Farmwald et al. | 395/309 |
| 5,517,626 | 5/1996 | Archer et al. | 395/290 |
| 5,528,764 | 6/1996 | Heil | 395/293 |
| 5,745,772 | 4/1998 | Klein | 395/739 |
| 5,790,839 | 8/1998 | Luk et al. | 395/556 |
| 5,793,995 | 8/1998 | Riley et al. | 395/308 |

*Primary Examiner*—Do Hyun Yoo
*Assistant Examiner*—Mehdi Namazi
*Attorney, Agent, or Firm*—Gunnison, McKay & Hodgson, LLP; Philip J. McKay

[57] ABSTRACT

The present invention provides an electronic system which includes an integrated circuit chip having a processor, a memory controller and a bus interface. The bus interface is both a memory interface and a system interface and has at least one address pin line, at least one data transfer pin line and at least one control pin line and is coupled to the processor and the memory controller. An S-DRAM is coupled to the bus interface wherein the processor and the S-DRAM share the same address pin line and data transfer pin line reducing the number of pins necessary to interface with the system. A system interface bridge chip interconnects the bus interface to one or more peripheral devices and includes a protocol module for managing interactions on the bus interface between the processor, the S-DRAM and the system interface bridge chip. An electronic system is thus provided which reduces the number of pins that an integrated circuit chip needs for interfacing without reducing performance.

6 Claims, 3 Drawing Sheets

REDUCED PIN SYSTEM INTERFACE

BACKGROUND OF THE INVENTION

1. Field of the Invention

This invention relates to a shared bus interface system for electronic systems which minimizes the number of pins required for high-integration processor chips.

2. Description of the Related Art

Most electronic systems and main memory systems, such as multimedia and computer systems, include microprocessor chips that use a system bus to interface to peripheral devices and a memory bus to interface to main memory. As a result of recent advances in semiconductor manufacturing technologies, the speed of operation and the level of integration of microprocessor chips have increased significantly. Microprocessor chips with integrated memory controllers, cache controllers and system interface controllers are now available. These high-integration chips have mostly been used for mid-range or low-end applications where power consumption, motherboard area or system cost were the primary concerns. However, ever increasing clock frequencies on current microprocessors has resulted in memory access time becoming the critical performance limiter. To deal with memory latency, even high-end versions of microprocessors are being implemented with a memory controller on the processor chip.

While an integrated memory controller definitely improves the memory access time by eliminating the cycles which are necessary to go through a system bus, it also uses a large number of pins for communicating to memory chips. High-end processors can use hundreds of pins exclusively to communicate with main memory chips. In cases where a second-level or third-level cache interface and a peripheral interface used for I/O also needs to be supported, the total number of required processor pins may become excessive for a realistic or economical implementation. Even for mid-range or low-end chips, where there is no need for a cache interface, the total number of pins required for memory, system I/O and any other feature specific interface may become too many for a low cost package. The die size also may become limited by the number of pin drivers required, where the chip may need to be manufactured using a die size which is greater than otherwise needed to contain the logic.

There have been several high-integration products integrating a processor, memory controller and a system bus interface on a single chip, such as, for example, Intel's 386SL and 486SL processors and Sun Microsystems' MicroSPARC™ I and II processors. However, all of these integrated circuit chips implement separate memory busses and system bus interfaces. Future generation processors will require 128–512 bit memory interface with 14–40 extra bits for address/control lines and 16–64 bits for error correction, which creates substantially more pressure on pin-count and die-size. One solution in addressing the pin-count issue, is the use of a very high speed memory interface, however, there is a technology risk involved in this solution because high-end processors are usually manufactured with new semiconductor processes.

Therefore, there is a need for a simple and economical solution that minimizes the number of pins required for a high-end integration processor chip without compromising the performance. It is expected that synchronous-dynamic random access memories (S-DRAM) will be increasingly used in the electronic systems market, and, therefore, a solution compatible with S-DRAM technology is economically viable.

To understand the concept of the present invention, it is helpful to review S-DRAM technology. Dynamic random access memory (DRAM) components provide an inexpensive solid state storage technology for digital systems. The digital information is maintained in the form of a charge stored on a two dimensional array of capacitors. There are two types of DRAMs: synchronous and asynchronous. In a S-DRAM, the time base is shared between the controller/processor and the DRAM component and is independent of the control signals sent to the S-DRAM. In an asynchronous DRAM, the control signals communicate the timing information in an asynchronous manner. Synchronous interfaces are desirable because information can be transferred at a higher rate.

SUMMARY OF THE INVENTION

The present invention provides an electronic system which includes an integrated circuit chip having a processor, a memory controller and a bus interface. The bus interface is both a memory interface and a system interface and has at least one address pin line, at least one data transfer pin line and at least one control pin line and is coupled to the processor and the memory controller. An S-DRAM is coupled to the bus interface wherein the processor and the S-DRAM share the same address pin line and data transfer pin line reducing the number of pins necessary to interface with the system. A system interface bridge chip interconnects the bus interface to one or more peripheral devices and includes a protocol module for managing interactions on the bus interface between the processor, the S-DRAM and the system interface bridge chip. An electronic system is thus provided which reduces the number of pins that an integrated circuit chip needs for interfacing without reducing performance.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
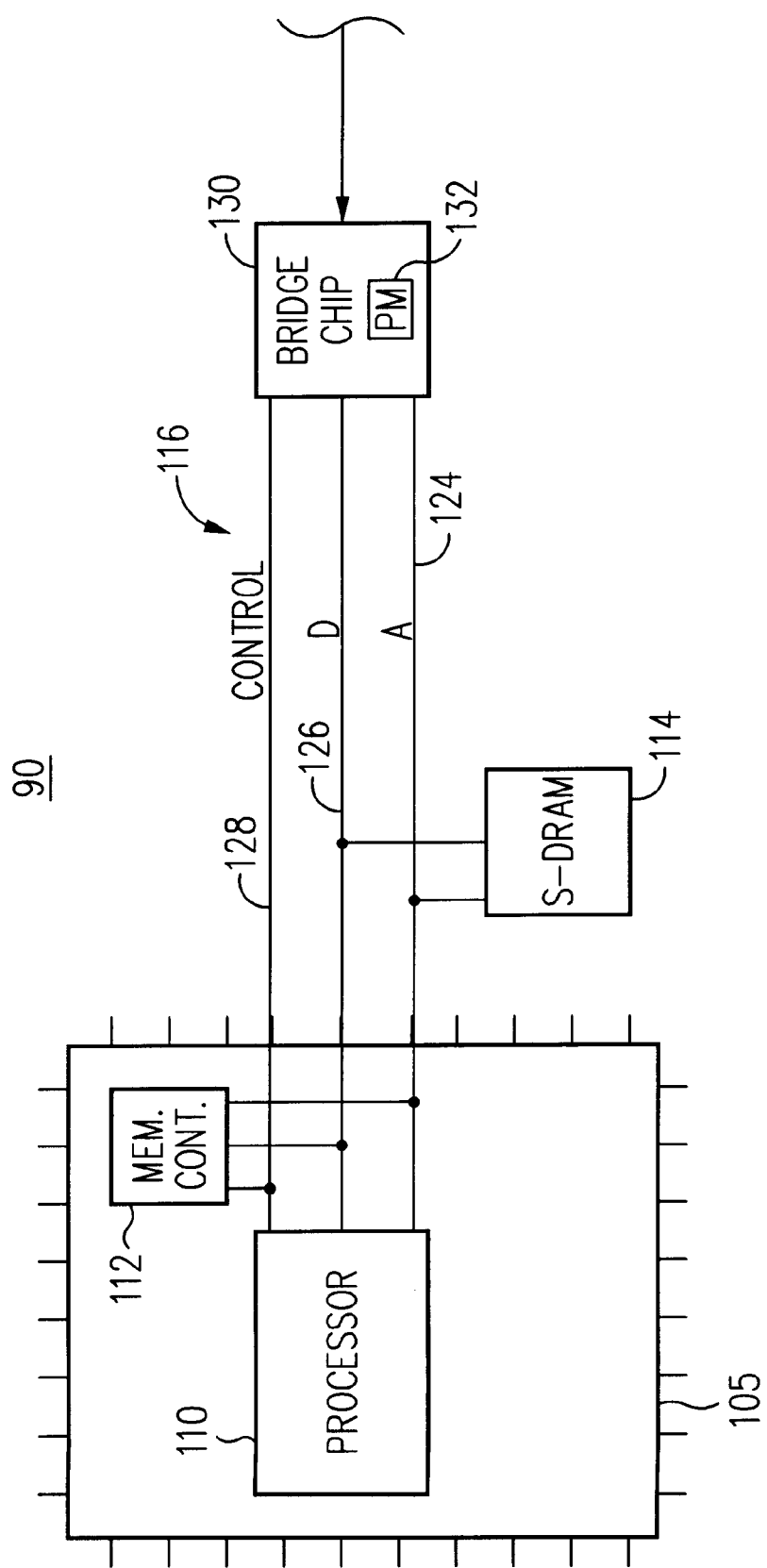
FIG. 1 shows a block diagram of an interface system of the present invention.

FIG. 1 illustrates the shared bus interface system 90 of the present invention used in an electronic system that includes a main memory, such as, for example, computer systems and multimedia systems. The shared bus interface system 90 includes an integrated circuit chip 105 having a processor 110, a memory controller 112 and a bus interface 116 integrated on a single chip. The bus interface 116, includes at least one address pin line 124, at least one data transfer pin line 126 and at least one control pin line 128 and is coupled to the processor 110 and the memory controller 112. The bus interface 116 is both a memory interface and a system interface which reduces the number of pins needed on the integrated circuit chip 105.

A synchronous dynamic random access memory (S-DRAM) 114 is coupled to the bus interface 116 wherein the processor 110 and the S-DRAM 114 share the same address pin line 124 and data transfer pin line 126. A system interface bridge chip 130 is interconnected to the bus interface 116 and to one or more peripheral devices (not shown in this figure). The system interface bridge chip 130 includes a protocol module 132 for managing interactions on the bus interface 116 between the processor 110, the S-DRAM 114 and the system interface bridge chip 130.

Figure 2:
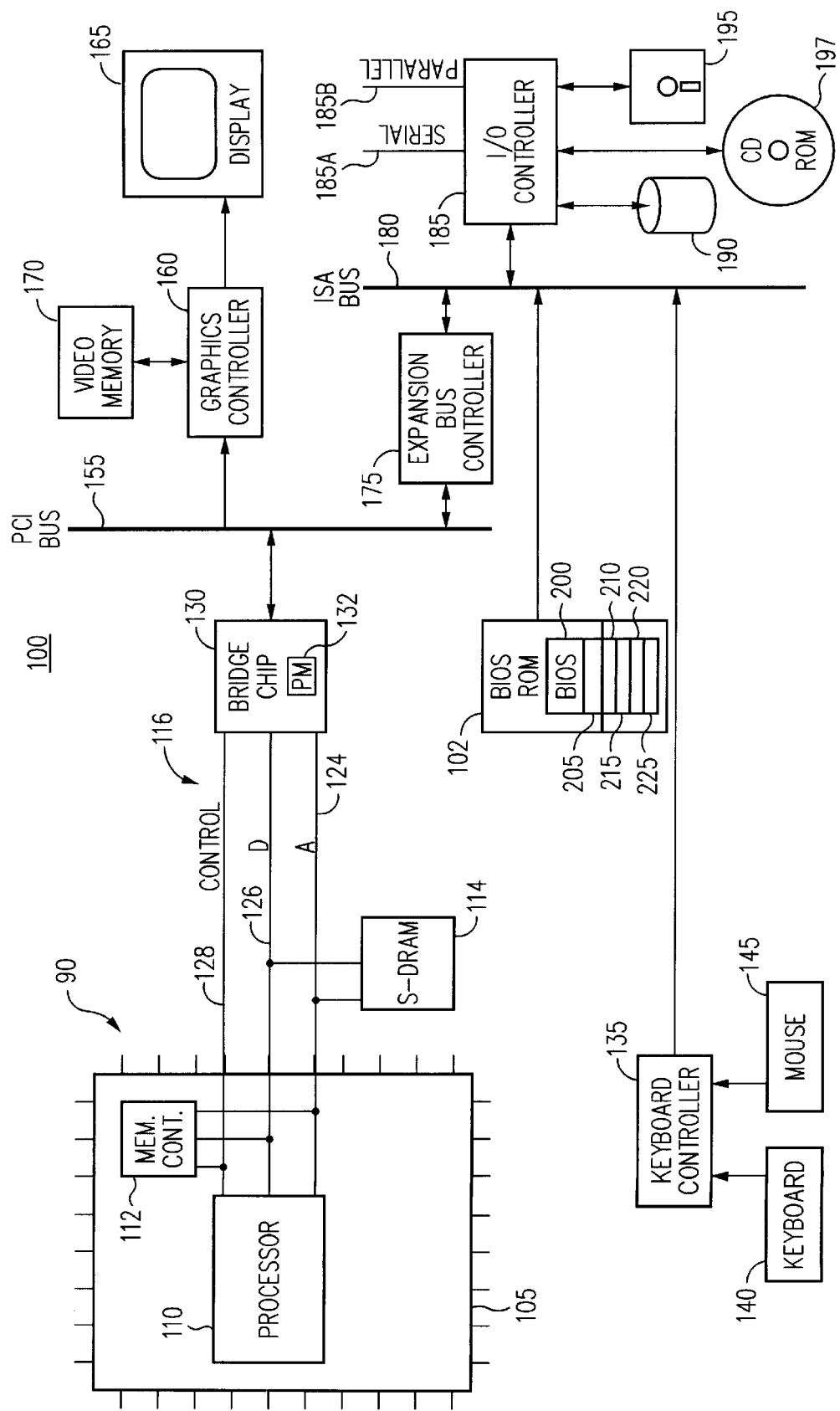
FIG. 2 shows a block diagram of the interface system of the present invention used in an electronic system such as the computer system illustrated.

Referring now to FIG. 2, an example of a computer system is illustrated including the shared bus interface system 90 of the present invention. The computer 100 includes an integrated circuit chip 105 including the processor 110, the memory controller 112 and the bus interface 116. The bus interface 116 is coupled to the processor 110 and the memory controller 112 and is both a memory interface and a system interface. The synchronous-dynamic random access memory (S-DRAM) 114 is coupled to the bus interface 116 and shares the same address pin line 124 and data transfer pin line 126 reducing the number of pins needed from the integrated circuit chip 105 to interface with the remaining computer system 100.

A system interface bridge chip 130 interconnects the bus interface 116 to one or more peripheral devices via a Peripheral Component Interconnect (PCI) bus 155. The protocol module 132 on the system interface bridge chip 130 manages interactions on the bus interface 116 between the processor 110, the S-DRAM 114 and the system interface bridge chip 130.

A graphics controller 160 couples a display 165 to PCI bus 155 to permit display of graphics images including messages to the user. A video memory 170 is coupled to graphics controller 160 to facilitate display of graphics images on display 165. A bus interface controller or expansion bus controller 175 couples PCI bus 155 to an expansion bus 180. Expansion bus 180 is an industry standard architecture (ISA) bus or other bus architecture, if desired. An input/output (I/O) controller 185 couples a hard drive 190, a floppy drive 195 and a CD ROM drive 197 to expansion bus 180 as shown. I/O controller 185 includes a serial port 185A and a parallel port 185B. Printers and other output devices can also be coupled to ISA bus 180 or PCI bus 155 to provide output to users. A keyboard controller 135 is coupled to ISA bus 180 so that user input can be provided to computer 100. Keyboard controller 135 is a microcontroller which interfaces input devices such as keyboard 140 and a pointing device or mouse 145 to computer 100.

Basic Input/Output System (BIOS) software 200 is stored in BIOS ROM 102. In this particular embodiment, BIOS ROM 102 is coupled to ISA bus 180. As seen in FIG. 2, BIOS 200 includes a plurality of routines or modules. The terms "module" and "routine" are used interchangeably in this document. Some of the modules employed by BIOS 200 are conventional. For example, BIOS 200 includes conventional routines or modules such as an initialization module 205, an interrupt vector table 210, a keyboard I/O module 215, a disk I/O module 220 and a timer—timer I/O module 225. Initialization routine 205 is responsible for initializing computer 100 to a known state. Interrupt vector table 210 is a table of the starting addresses of each of the routines or modules of BIOS 200 such that the computer can readily execute a particular module when a corresponding software interrupt is received by the BIOS. Keyboard I/O module 215 controls the interaction of BIOS 200 with keyboard 140. Disk I/O module controls the interaction of BIOS 200 with hard disk 190, floppy disk 195 and CD ROM 197. The Timer—Timer I/O module controls the interaction of the BIOS with I/O controller 185, serial port 185A and parallel port 185B.

The integrated circuit chip 105 of the present invention, which integrates the processor 110 and the memory controller 112 on a single chip, uses a single bus interface 116 as both a memory bus and a system interface bus which reduces the number of pins on the integrated circuit chip 105 by eliminating the need for an additional bus interface. When the same pins are shared for the memory bus and the system interface bus, the processor 110 on the integrated circuit chip 105 is typically accessing memory (S-DRAM 114) or accessing the bus interface 116, therefore the system and method of the present invention does not impede performance.

At least one control pin line 128 is added to the bus interface 116 for flow control communication with the system interface bridge chip 130. The protocol module 132 manages interactions on the bus interface 116 between the processor 110 (a first master device), the system interface bridge chip 130 (a second master device), and the S-DRAM 114 (a slave device). The synchronous nature of the S-DRAM 114 makes implementation of the present invention easier because all system busses and events are synchronized to a clock frequency.

Figure 3:
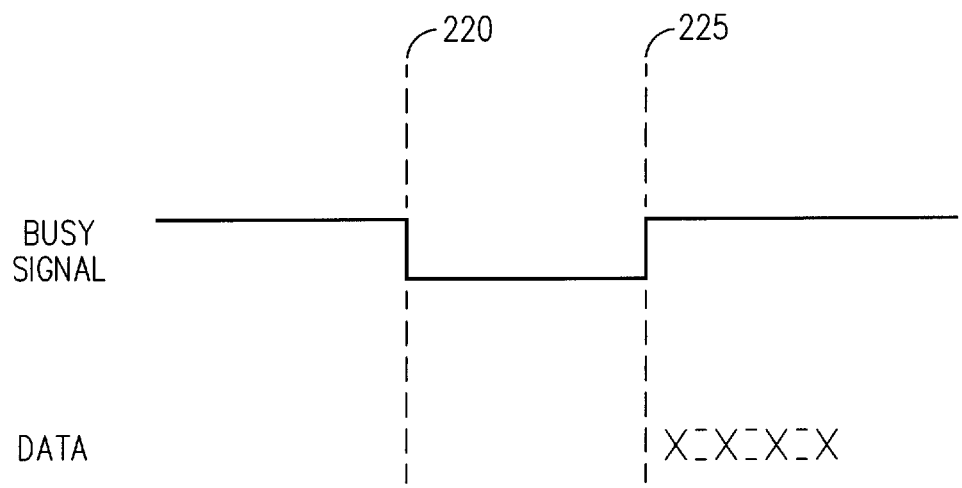
FIG. 3 is a signal chart illustrating the method of the present invention in accordance with a first embodiment.

For example, as illustrated in FIG. 3, in a first embodiment of the present invention, the memory controller 112 identifies each address transmitted from the processor 110 and determines if the address is a memory address or a peripheral address. When the address is a memory address, the memory controller 112 performs a standard S-DRAM cycle to access the S-DRAM 114, however, when the address is a peripheral address, the memory controller 112 notifies the protocol module 132 and the protocol module 132 asserts a BUSY signal 220 onto the control pin line 128 of the bus interface 116 and accepts a transaction as indicated by the peripheral address. When the protocol module 132 receives a transaction request from a peripheral device, the protocol module 132 initiates and completes the transaction as requested by the peripheral device and transfers data to the memory controller 112 after de-asserting the BUSY signal 225.

Figure 4:
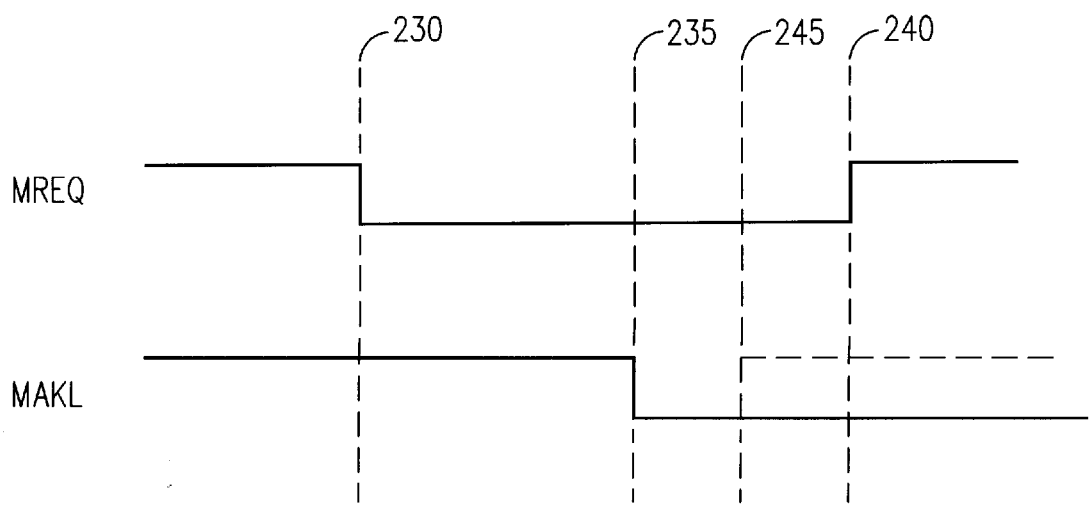
FIG. 4 is a signal chart illustrating the method of the present invention in accordance with a first embodiment.

FIG. 4 illustrates a second embodiment of the present invention, wherein a first flow control signal (a request signal "MREQ") and a second flow control signal (an acknowledge signal "MAKL") are used to assist in managing interactions on the bus interface 116. Usually, the processor 110 has control of the S-DRAM 114, however, the protocol module 132 asserts the first flow control signal MREQ 230 to the processor 110 on the control pin line 128 to indicate to the processor 110 a requirement for access to the S-DRAM 114. When the processor 110 receives the first flow control signal MREQ, the processor 110 completes currently activated transactions with the S-DRAM 114 and asserts the second flow control signal MAKL 235 to the protocol module 132 on the control pin line 128 to allow the protocol module 132 to proceed with access to the S-DRAM 114. When the protocol module 132 no longer requires access to the S-DRAM 114, the protocol module 132 de-asserts the first flow control signal MREQ 240 on the control pin line 128 and the processor 110 resumes control of the S-DRAM 114. If the processor 110 requires access to the S-DRAM 114 while the protocol module 132 has access to the S-DRAM 114, the processor 114 interrupts the protocol module's 132 access to the S-DRAM 114 by de-asserting the second flow control signal MAKL 245 to the protocol module 132 to resume control of the S-DRAM 114.

The foregoing has described a system and method which provides a single integrated circuit chip including a processor and a memory controller and an S-DRAM with a shared bus interface instead of separate memory interface and system interface busses which reduces the number of pins needed for the integrated circuit chip to interface with the main memory and system peripherals without reducing performance.

Other embodiments are within the following claims and while only certain features of the invention have been shown by way of illustration, many modifications and changes will occur. It is, therefore, to be understood that the present claims are intended to cover all such modifications and changes which fall within the true spirit of the invention.

What is claimed is:

1. An electronic system comprising:
   an integrated circuit chip including:
   a processor wherein the processor transmits and receives addresses and data;
   a memory controller;
   a bus interface having at least one address pin line, at least one data transfer pin line, and at least one control pin line, wherein the processor and the memory controller are coupled to the bus interface and the bus interface is both a memory interface and a system interface;
   a synchronous dynamic random access memory (S-DRAM) coupled to the bus interface wherein each of the at least one address pin line and each of the at least one data transfer pin line are shared by the processor and the S-DRAM; and
   a system interface bridge chip interconnected to the bus interface and to one or more peripheral devices, and including:
   a protocol module wherein said protocol module manages interactions on the bus interface between the processor, the S-DRAM, and the system interface bridge chip;
   wherein the memory controller identifies each address transmitted from the processor and determines if the address is a memory address or a peripheral address and when the address is a memory address, the memory controller performs a standard S-DRAM cycle to access the S-DRAM and when the address is a peripheral address, the memory controller notifies the protocol module and the protocol module asserts a BUSY signal onto the at least one control pin line of the bus interface and accepts a transaction as indicated by the peripheral address.

2. The electronic system of claim 1 wherein, when the protocol module receives a transaction request from a peripheral device, the protocol module initiates and completes the transaction as requested by the peripheral device and transfers data to the memory controller after de-asserting the BUSY signal.

3. The electronic system of claim 1 further comprising:
   a first flow control signal and a second flow control signal; and
   wherein the processor has control of the S-DRAM;
   wherein the protocol module asserts the first flow control signal to the processor on the control pin line to indicate to the processor a requirement for access to the S-DRAM; and
   wherein, when the processor receives the first flow control signal, the processor completes currently activated transactions with the S-DRAM and asserts the second flow control signal to the protocol module on the control pin line to allow the protocol module to proceed with access to the S-DRAM; and
   wherein, when the protocol module no longer requires access to the S-DRAM, the protocol module de-asserts the first flow control signal on the control pin line and the processor resumes control of the S-DRAM.

4. The electronic system of claim 3 wherein, when the processor requires access to the S-DRAM while the protocol module has access to the S-DRAM, the processor interrupts the protocol module's access to the S-DRAM by de-asserting the second flow control signal to the protocol module to resume control of the S-DRAM.

5. A method comprising:
   including a processor, a memory controller, and a bus interface coupled to said processor and said memory controller on an integrated circuit chip, wherein the bus interface includes at least one address pin line, at least one data transfer pin line, and at least one control pin line; and the bus interface is both a memory interface and a system interface;
   coupling a synchronous dynamic random access memory (S-DRAM) to the bus interface wherein each of the at least one address pin line and each Of the at least one data transfer pin line are shared by the processor and the S-DRAM;
   interconnecting a system interface bridge chip to the bus interface and to one or more peripheral devices; and
   managing interactions on the bus interface between the processor, the S-DRAM, and the system interface bridge chip including;
   identifying each address transmitted for the processor and determining if said address is a memory address or a peripheral device address,
   performing a standard S-DRAM cycle to access the S-DRAM, when the address is a memory address;
   asserting a BUSY signal onto the at least one control pin line of the bus interface and accepting a transaction as indicated by the peripheral address, when the address is a peripheral address; and
   initiating and completing a transaction as requested by a peripheral device, when a transaction request is received from a peripheral device and transferring data to the memory controller after de-asserting the BUSY signal.

6. A method comprising:
   including a processor, a memory controller, and a bus interface coupled to said processor and said memory controller on an integrated circuit chip, wherein the bus interface includes at least one address pin line, at least one data transfer pin line, and at least one control pin line; and the bus interface is both a memory interface and a system interface;
   coupling a synchronous dynamic random access memory (S-DRAM) to the bus interface wherein each of the at least one address pin line and each of the at least one data transfer pin line are shared by the processor and the S-DRAM;
   interconnecting a system interface bridge chip to the bus interface and to one or more peripheral devices; and
   managing interactions on the bus interface between the processor, the S-DRAM, and the system interface bridge chip including:

asserting a first flow control signal to the processor on the at least one control pin line to indicate to the processor a requirement by a protocol module for access to the S-DRAM;

completing currently activated transactions with the S-DRAM by the processor, and asserting a second flow control signal by the processor to the protocol module on the at least one control pin line to allow the protocol module to access the S-DRAM;

de-asserting the first flow control signal on the at least one control pin line by the protocol module upon the protocol module no longer requiring access to the S-DRAM, and the processor resumes control of the S-DRAM; and interrupting the protocol's module access to the S-DRAM, upon the processor requiring access to the S-DRAM, by the processor de-asserting the second flow control signal to the protocol module to resume control of the S-DRAM.

* * * * *